United States Patent
Pavao

(10) Patent No.: US 10,676,640 B1
(45) Date of Patent: Jun. 9, 2020

(54) DURABLE ALIPHATIC MOISTURE CURE POLYURETHANE COATING FOR PROTECTING THE TIP AND SHOULDER AREA OF A WOOD DRUMSTICK

(71) Applicant: Stephane Pavao, Blainville (CA)

(72) Inventor: Stephane Pavao, Blainville (CA)

( * ) Notice: Subject to any disclaimer, the term of this patent is extended or adjusted under 35 U.S.C. 154(b) by 170 days.

(21) Appl. No.: 16/013,756

(22) Filed: Jun. 20, 2018

(51) Int. Cl.
| | |
|---|---|
| *C09D 175/04* | (2006.01) |
| *C09D 7/63* | (2018.01) |
| *C09D 7/65* | (2018.01) |
| *C09D 7/20* | (2018.01) |

(52) U.S. Cl.
CPC ............. *C09D 175/04* (2013.01); *C09D 7/20* (2018.01); *C09D 7/63* (2018.01); *C09D 7/65* (2018.01)

(58) Field of Classification Search
CPC .......... C09D 175/04; C09D 7/00; C09D 7/63; C09D 7/20; C09D 7/65
See application file for complete search history.

(56) References Cited

U.S. PATENT DOCUMENTS

2005/0123764 A1*  6/2005  Hoffmann ............... B05D 3/207
428/409

* cited by examiner

*Primary Examiner* — Christopher M Rodd
(74) *Attorney, Agent, or Firm* — Russ Weinzimmer & Associates, P.C.

(57) ABSTRACT

A moisture cure polyurethane durable coating with an acrylic additive to enhance strength and durability, for application to a drumstick having a standard clear coating. The durable coating bonds to the standard clear coating, and helps to resist impacts and abrasions, thereby protecting the tip and shoulder area of the drumstick when the drumstick strikes the rim of a drum, or the edge of a cymbal. The durable coating helps to protect the drumstick from early breakage, thereby extending the useful life of the drumstick. The coating has an aesthetic pearl finish with a satin sheen and excellent color retention properties. The durable coating includes aliphatic polyisocyanates which resist yellowing better than aromatic urethanes. The coating procedure features fast low-temperature drying, and quick re-coating times. The durable coating can be formulated as a pearl finish using titanium dioxide pigment, or as a translucent metallic finish using aluminum powder pigment.

11 Claims, No Drawings

DURABLE ALIPHATIC MOISTURE CURE POLYURETHANE COATING FOR PROTECTING THE TIP AND SHOULDER AREA OF A WOOD DRUMSTICK

FIELD OF THE INVENTION

The invention relates generally to paints and coatings, and more particularly to moisture cure polyurethane (MCU) coatings with acrylate polymer additives for enhanced resistance to impact damage and abrasion.

BACKGROUND OF THE INVENTION

Coatings for resisting impact damage are known for protecting wood, metal, masonry, concrete, cement, and fiberglass, for example.

Polyurethane varnishes are known to protect wood, since they have some inherent flexibility (toughness, as distinct from hardness), allowing them to absorb impacts better without cracking. Moisture cure polyurethanes are known for protecting hardwood floors. A moisture cure polyurethane uses moisture in the air to cure and cross-link.

Moisture cure polyurethane (also called "moisture cured", and "moisture curing") with an acrylate polymer additive, such as a copolymer of butyl methacrylate and methyl methacrylate (BMA/MMA copolymer), is known for use as a durable coating for steel structures such as bridges.

Yet, there are technical challenges in applying a coating of moisture cure polyurethane with an acrylate polymer additive to a wood surface, due to problems with low chemical compatibility between the coating and typical wood surface finishes, such as the clear finish commonly found on wood drum sticks, thereby preventing good adhesion.

Additionally, strong impact resistance and abrasion resistance are required of the coating on the tip and shoulder area of wood drumsticks so that the impact-protective coating does not tend to chip off and break away as the drumstick is hit against the rims of drums and cymbals.

SUMMARY OF THE INVENTION

The durable coating of the invention provides a moisture cure polyurethane coating with an acrylic additive for enhanced strength and durability. When applied to a drumstick having a standard clear coating, the durable coating of the invention bonds to the standard clear coating, and helps to resist impacts and abrasions so as to protect the shoulder area of the drumstick when the drumstick strikes the rim of a drum or the edge of a high-hat cymbal.

This durable coating is compatible with and can be coated over a typical drumstick finish so as to provide a durable coating for a drumstick that resists impact and abrasion. Since the durable coating of the invention is a little flexible and not significantly brittle, the durable coating tends to not break away from the drumstick as it strikes the rim of a drum or the edge of a high-hat cymbal.

The durable coating of the invention provides a durable finish that helps protect a drumstick from early breakage, while extending the wear and tear that a drumstick can take while playing. The durable coating of the invention has been formulated so as to minimize microbubbles and "fish eyes" upon application of the durable coating to a drumstick. The durable coating of the invention can also be applied on bare wood, with acceptable adhesion.

The durable coating can be provided as a ready-to-use product for the applicator, such as a manufacturer of drumsticks. The applicator just needs to mix the product properly, as set forth below, and then apply to the substrate, i.e., either bare wood or normally coated wood.

The durable coating is based on a formula which includes ingredients that enable it to be applied over a typical drumstick finish. An important feature of the formula of the invention is chemical compatibility between the typical drum stick finish and the durable coating of the invention.

The durable coating of the invention is a one-component moisture cure polyurethane-acrylic pearl finish.

The durable coating of the invention provides an aesthetic smooth finish with a satin sheen and excellent color retention properties. The durable coating of the invention includes aliphatic polyisocyanates which resist yellowing better than aromatic urethanes.

The durable coating of the invention is an ideal topcoat with superior resistance to UV and weathering, and has excellent robustness against impact and abrasion.

The durable coating of the invention exhibits quick recoat times, fast drying, and dries at low temperatures. The coating procedure of the invention features fast low-temperature drying, and quick re-coating times.

The durable coating of the invention can be formulated as a pearl white satin finish using titanium dioxide (CAS Number 13463-67-7) as a pigment. Alternatively, the coating of the invention can be formulated with an aluminum pigment (CAS Number 7429-90-5) instead of titanium dioxide (CAS Number 13463-67-7) as a pigment.

A general aspect of the invention is a durable coating composition for protecting at least the tip and shoulder area of a wood drumstick. The durable coating composition includes:

| | | |
|---|---|---|
| 1330-20-7 | Xylene | 10-30% |
| 28182-81-2 | Hexane, 1,6-diisocyanato-, homopolymer | 10-30% |
| 108-65-6 | 2-Methoxy-1-methylethyl acetate | 10-30% |
| 110-43-0 | Methyl amyl ketone | 5-10% |
| 540-88-5 | Tert-butyl acetate | 5-10% |
| 14807-96-6 | Talc (Mg3H2(SiO3)4) | 1-5% |
| 97-88-1/80-62-6 | BMA/MMA copolymer | 1-5% |
| 584-84-9 | 4-methyl-m-phenylene diisocyanate | 0.1-1% |
| 13463-67-7 | Titanium dioxide | 0.1-1% |
| 91-08-7 | 2-Methyl-m-phenylene diisocyanate | 0.1-1% |
| 108-83-8 | 2,6-Dimethyl-4-heptanone | 0.1-1% |
| 4083-64-1 | Benzenesulfonyl Isocyanate, 4-Methyl- | 0.1-1% |
| 34590-94-8 | Dipropylene glycol monomethyl ether | 0.1-1% |
| 26523-78-4 | Tris(nonylphenyl)phosphate | 0.01-0.1% |

In some embodiments, the durable coating composition further includes: 77-58-7 Dibutyltin dilaurate 0.01-0.1%

Another general aspect of the invention is a method for making a durable coating composition for application to a wood drumstick. The method includes: premixing BMA/MMA copolymer and methyl amyl ketone, blending the BMA/MMA copolymer and methyl amyl ketone, and when the BMA/MMA copolymer is dissolved in the methyl amyl ketone, adding dipropylene glycol monomethyl ether and xylene so as to provide a first premix; premixing 2-methoxy-1-methylethyl acetate and titanium dioxide, and blending so as to provide a second premix; premixing tert-butyl acetate, Talc, and 2,6-Dimethyl-4-heptanone, and blending at high speed so as to provide a third premix; mixing the first premix, the second premix, and the third premix, and blending so as to provide a first mixture; adding Benzenesulfonyl Isocyanate, 4-Methyl- to the first mixture, while controlling moisture so as to be lower than 400 ppm, so as to provide a second mixture; adding to the second mixture: Hexane, 1,6-diisocyanato-, homopolymer, 4-Methyl-m-phenylene diisocyanate, 2-Methyl-m-phenylene diisocyanate, Tris(nonylphenyl)phosphate, and Dibutyltin dilaurate, so as to provide a third mixture; and blending the third mixture so as to provide the durable coating composition.

In some embodiments, each chemical substance is added in an amount in accordance with a respective weight percentage:

| | | |
|---|---|---|
| 1330-20-7 | Xylene | 10-30% |
| 28182-81-2 | Hexane, 1,6-diisocyanato-, homopolymer | 10-30% |
| 108-65-6 | 2-Methoxy-1-methylethyl acetate | 10-30% |
| 110-43-0 | Methyl amyl ketone | 5-10% |
| 540-88-5 | Tert-butyl acetate | 5-10% |
| 14807-96-6 | Talc (Mg3H2(SiO3)4) | 1-5% |
| 97-88-1/80-62-6 | BMA/MMA copolymer | 1-5% |
| 584-84-9 | 4-Methyl-m-phenylene diisocyanate | 0.1-1% |
| 13463-67-7 | Titanium dioxide | 0.1-1% |
| 91-08-7 | 2-Methyl-m-phenylene diisocyanate | 0.1-1% |
| 108-83-8 | 2,6-Dimethyl-4-heptanone | 0.1-1% |
| 4083-64-1 | Benzenesulfonyl Isocyanate, 4-Methyl- | 0.1-1% |
| 34590-94-8 | Dipropylene glycol monomethyl ether | 0.1-1% |
| 26523-78-4 | Tris(nonylphenyl)phosphate | 0.01-0.1% |

Another general aspect of the invention is a method for making a durable coating composition. This method includes: preparing a BMA/MMA copolymer solution by dissolving from 1% to 5% of BMA/MMA copolymer in methyl amyl ketone in the range from 5% to 10%, followed by adding from 0.1% to 1% of dipropylene glycol monomethyl ether and from 10% to 30% of xylene, so as to provide a first premix; mixing from 10% to 30% of 2-methoxy-1-methylethyl acetate and from 0.1% to 1% of titanium dioxide, and blending so as to provide a second premix; mixing from 5% to 10% of tert-butyl acetate, from 1% to 5% of Talc (Mg3H2(SiO3)4), and from 0.1% to 1% of 2,6-dimethyl-4-heptanone, and blending at high speed so as to provide a third premix; mixing the first premix, the second premix, and the third premix, and blending so as to provide a first mixture; adding from 0.1% to 1% of benzenesulfonyl isocyanate, 4-methyl-m-phenylene diisocyanate to the first mixture, while controlling moisture so as to be less than 400 ppm, so as to provide a second mixture; adding to the second mixture: from 10% to 30% of hexane, 1,6-diisocyanato-, homopolymer, from 0.1% to 1% of 4-methyl-m-phenylene diisocyanate, from 0.1% to 1% of 2-methyl-m-phenylene diisocyanate, from 0.01% to 0.1% of tris(nonylphenyl)phosphate, and from 0.01% to 0.1% of dibutyltin dilaurate, so as to provide a third mixture; and blending the third mixture, thereby providing the durable coating composition.

Another general aspect of the invention is a durable coating for protecting a wood surface, prepared from a composition including: a mixture of polyisocyanates and diisocyanates having: from 10% to 30% of Hexane, 1,6-diisocyanato-, homopolymer; from 0.1% to 1% of 4-methyl-m-phenylene diisocyanate; and from 0.1% to 1% of 2-methyl-m-phenylene diisocyanate; from 1% to 5% of BMA/MMA copolymer; from 1% to 5% of Talc (Mg3H2(SiO3)4) as filler; from 0.1% to 1% of pigment; from 0.1% to 1% of benzenesulfonyl isocyanate, 4-methyl-m-phenylene diisocyanate as a first process stabilizer; from 0.01% to 0.1% of tris(nonylphenyl)phosphate as a second process stabilizer; and from 0.1% to 1% of 2,6-dimethyl-4-heptanone as a defoamer.

In some embodiments, the pigment is titanium dioxide.

In some embodiments, the pigment is aluminum powder.

In some embodiments, the composition further includes: from 0.01% to 0.1% of dibutyltin dilaurate.

In some embodiments, the composition further includes: a mixture of solvents selected from the group of: xylene, 2-methoxy-1-methylethyl acetate, methyl amyl ketone, tert-butyl acetate, dipropylene glycol monomethyl ether.

In some embodiments, the wood surface is the tip and the shoulder area of a wood drumstick.

In some embodiments, the composition is prepared by a process including: preparing a BMA/MMA copolymer solution by dissolving from 1% to 5% of BMA/MMA copolymer in methyl amyl ketone in the range from 5% to 10%, followed by adding from 0.1% to 1% of dipropylene glycol monomethyl ether and from 10% to 30% of xylene, so as to provide a first premix; mixing from 10% to 30% of 2-methoxy-1-methylethyl acetate and from 0.1% to 1% of titanium dioxide, and blending so as to provide a second premix; mixing from 5% to 10% of tert-butyl acetate, from 1% to 5% of Talc (Mg3H2(SiO3)4), and from 0.1% to 1% of 2,6-dimethyl-4-heptanone, and blending at high speed so as to provide a third premix; mixing the first premix, the second premix, and the third premix, and blending so as to provide a first mixture; adding from 0.1% to 1% of benzenesulfonyl isocyanate, 4-methyl-m-phenylene diisocyanate to the first mixture, while controlling moisture so as to be less than 400 ppm so as to provide a second mixture; adding to the second mixture: from 10% to 30% of hexane, 1,6-diisocyanato-, homopolymer, from 0.1% to 1% of 4-methyl-m-phenylene diisocyanate, from 0.1% to 1% of 2-methyl-m-phenylene diisocyanate, from 0.01% to 0.1% of tris(nonylphenyl)phosphate, and from 0.01% to 0.1% of dibutyltin dilaurate, so as to provide a third mixture; and blending the third mixture, thereby providing the durable coating composition.

DETAILED DESCRIPTION

Moisture cured urethanes (MCU's) are one-component urethanes that cure using ambient moisture and humidity. These moisture cured urethane coatings can normally handle higher dry service temperatures than epoxies and two component urethanes. Moisture cured urethane coatings provide a hard finish that is very durable. While, most MCU's are aromatic, which means they can change color towards yellow over a period of time, aliphatic MCU's resist yellowing better than aromatic MCU's.

With reference to TABLE 1 below, the ingredients of an embodiment of the durable coating of the invention are set forth. In Table 1, the chemical name of each ingredient is preceded by its CAS Registry Number, and is followed by the ingredient class or purpose of each ingredient of the durable coating of the invention.

In paint manufacturing, there are five different classes of ingredients: solvent, resin, pigment, filler, and additives (e.g., defoamer, process stabilizer, dryer).

A CAS Number, also referred to as CASRN or CAS Registry Number, is a unique numerical identifier assigned by Chemical Abstracts Service (CAS) to every chemical substance described in the open scientific literature (currently including those described from at least 1957 through the present), including organic and inorganic compounds, minerals, isotopes, alloys, and nonstructurable materials (UVCBs of unknown variable composition, or biological origin). For example, acetone and dimethyl ketone have the same CAS Number because they are actually the same substance.

TABLE 1

| | | |
|---|---|---|
| 108-83-8 | 2,6-Dimethyl-4-heptanone | defoamer |
| 4083-64-1 | Benzenesulfonyl Isocyanate, 4-Methyl- | process stabilizer |
| 26523-78-4 | Tris(nonylphenyl)phosphate | process stabilizer |
| 77-58-7 | Dibutyltin dilaurate | dryer |
| 97-88-1/80-62-6 | BMA/MMA copolymer | resin |
| 34590-94-8 | Dipropylene glycol monomethyl ether | solvent |
| 1330-20-7 | xylene | solvent |
| 28182-81-2 | Hexane, 1,6-diisocyanato-, homopolymer | resin |
| 108-65-6 | 2-methoxy-1-methylethyl acetate | solvent |
| 110-43-0 | methyl amyl ketone | solvent |
| 540-88-5 | tert-butyl acetate | solvent |
| 14807-96-6 | Talc (Mg3H2(SiO3)4) | filler |
| 584-84-9 | 4-methyl-m-phenylene diisocyanate | resin |
| 13463-67-7 | titanium dioxide | pearl pigment |
| 91-08-7 | 2-methyl-m-phenylene diisocyanate | resin |

The dryer 77-58-7 Dibutyltin dilaurate helps the product to cure harder faster. Thus, 77-58-7 Dibutyltin dilaurate 0.01-0.1% is included optionally for faster curing. Without including the dryer 77-58-7 Dibutyltin dilaurate 0.01-0.1%, the formula will cure, but more slowly than when the dryer is included.

Process stabilizers are important to provide long term stability of the product while stored in a can, so that the product will have a long shelf life.

97-88-1/80-62-6 BMA/MMA copolymer is: Butyl acrylate/methyl methacrylate/methacrylic acid copolymer.

With reference to TABLE 2 below, the ingredients of a more particular embodiment of the durable coating of the invention are set forth. In Table 2, the chemical name of each ingredient is preceded by its CAS Registry Number, and is followed by the percent (%) range in a mixture of the ingredients of the embodiment of the durable coating, where the percentage range (%) is based on weight percentage:

TABLE 2

| | | |
|---|---|---|
| 330-20-7 | xylene | 10-30% |
| 28182-81-2 | Hexane, 1,6-diisocyanato-, homopolymer | 10-30% |
| 108-65-6 | 2-methoxy-1-methylethyl acetate | 10-30% |
| 110-43-0 | methyl amyl ketone | 5-10% |
| 540-88-5 | tert-butyl acetate | 5-10% |
| 14807-96-6 | Talc (Mg3H2(SiO3)4) | 1-5% |
| 584-84-9 | 4-methyl-m-phenylene diisocyanate | 0.1-1% |
| 13463-67-7 | titanium dioxide | 0.1-1% |
| 91-08-7 | 2-methyl-m-phenylene diisocyanate | 0.1-1% |
| 108-83-8 | 2,6-Dimethyl-4-heptanone | 0.1-1% |
| 4083-64-1 | Benzenesulfonyl Isocyanate, 4-Methyl- | 0.1-1% |
| 26523-78-4 | Tris(nonylphenyl)phosphate | 0.01-.1% |
| 77-58-7 | Dibutyltin dilaurate | 0.01-.1% |
| 97-88-1/80-62-6 | BMA/MMA copolymer | 1-5% |
| 34590-94-8 | Dipropylene glycol monomethyl ether | 0.1-1% |

In this formula, the Hexane, 1,6-diisocyanato-, homopolymer, 4-Methyl-m-phenylene diisocyanate, 2-Methyl-m-phenylene diisocyanate, and BMA/MMA copolymer are the resin materials, which make up the bulk of the coating. The 2,6-Dimethyl-4-heptanone is a defoamer, which prevents bubble formation during the coating process. Benzenesulfonyl Isocyanate, 4-Methyl- and Tris(nonylphenyl) phosphate are process stabilizers, which provide long term storage stability. Dibutyltin dilaurate is a dryer, which speeds up the curing process. The product will still cure properly without the dryer, but slower. The rest of the ingredients are solvents which are added in different steps of the mixing process.

Adding too little defoamer (108-83-8 2,6-Dimethyl-4-heptanone) to the mixture results in microbubbles, and adding too much defoamer can cause "fish eyes". The right amount of defoamer (0.1-1%) avoids both microbubbles and fish eyes.

Instead of including titanium dioxide as the pigment to provide a pearl white finish, one could alternatively include aluminum pigment, and one could vary the amount of aluminum pigment in accordance with the amount of translucency desired.

Preparation of the mixture according to the ratios listed in Table 2 includes the following steps:

Premix BMA/MMA copolymer with Methyl amyl ketone solvent. Mix for 2 hours. Once the polymer is dissolved, add Dipropylene glycol monomethyl ether and Xylene solvents. Put this premix aside as Premix 1.

Premix 2-Methoxy-1-methylethyl acetate with Titanium dioxide. Mix for 15 minutes. Put this pigment premix aside as Premix 2.

Blend tert-Butyl acetate, Talc, 2,6-Dimethyl-4-heptanone. Mix at high speed for 15 minutes.

Add Premix 1 and Premix 2, mix for 15 minutes.

Add Benzenesulfonyl Isocyanate, 4-Methyl- and control moisture to be lower than 400 ppm.

Add Hexane, 1,6-diisocyanato-, homopolymer, 4-Methyl-m-phenylene diisocyanate, 2-Methyl-m-phenylene diisocyanate, Tris(nonylphenyl)phosphate, Dibutyltin dilaurate, and mix for 15 minutes.

The entire content of each batch of the mixture must be mixed well, and all detrimental foreign matter, such as dirt or other contaminants, must be removed from the coating substrate (e.g., the shoulder and/or tip of a typically coated wood drumstick) before application of the durable coating. During the coating process, the contents should be mixed frequently to keep the pigment (e.g., titanium dioxide) in suspension so as to provide a uniform finish. Adding a thinner (also called a "reduction solvent") is not required or recommended.

The application of the durable coating to the tip and shoulder of a drumstick can be performed by dipping. Alternatively, the durable coating can be applied by spraying. The entire drumstick can be coated with the durable coating.

The dust-free drying time at 73 degrees is 30 minutes after application of a coat of the durable coating. The minimum recoat time at 73 degrees is 30 minutes. The maximum recoat time at 73 degrees is 16 hours. The drying time at 73 degrees to hard cure is 8 hours after application of the durable coating, but requires 7 days to achieve 100% cure.

The durable coating will hard cure after 8 hours. However, a portion of the resin composition will only achieve 100% performance after 7 days of curing, since it is a one component polyurethane resin.

It is recommend to apply the product at 1.5-2.0 mils dry film thickness (D.F.T.) to provide protection against damage to the drumstick.

Multiple coats of the formula of the invention can be applied to get higher build film. In particular, the thickness can be doubled from 1.5-2.0 mils to 3-4 mils thickness. The waiting period between coats is ideally between 2 hours, and not more than 16 hours.

Each gallon of the durable coating will cover 401 ft² at a D.F.T. of 1 mil.

Solids by volume is 25%+/−2%. Solids by weight is 35%+/−2%. The shelf life unopened is 12 months at 77 degrees. The Viscosity (Ford #4) is 10-12 seconds. The Specific Gravity is 0.99-1.05.

Other modifications and implementations will occur to those skilled in the art without departing from the spirit and the scope of the invention as claimed. Accordingly, the above description is not intended to limit the invention, except as indicated in the following claims.

What is claimed is:

1. A durable coating composition for protecting at least the tip and shoulder area of a wood drumstick, the durable coating composition comprising:

| | | |
|---|---|---|
| 1330-20-7 | Xylene | 10-30% |
| 28182-81-2 | Hexane, 1,6-diisocyanato-, homopolymer | 10-30% |
| 108-65-6 | 2-Methoxy-1-methylethyl acetate | 10-30% |
| 110-43-0 | Methyl amyl ketone | 5-10% |
| 540-88-5 | Tert-butyl acetate | 5-10% |
| 14807-96-6 | Talc (Mg3H2(SiO3)4) | 1-5% |
| 97-88-1/80-62-6 | BMA/MMA copolymer | 1-5% |
| 584-84-9 | 4-methyl-m-phenylene diisocyanate | 0.1-1% |
| 13463-67-7 | Titanium dioxide | 0.1-1% |
| 91-08-7 | 2-Methyl-m-phenylene diisocyanate | 0.1-1% |
| 108-83-8 | 2,6-Dimethyl-4-heptanone | 0.1-1% |
| 4083-64-1 | Benzenesulfonyl Isocyanate, 4-Methyl- | 0.1-1% |
| 34590-94-8 | Dipropylene glycol monomethyl ether | 0.1-1% |
| 26523-78-4 | Tris(nonylphenyl)phosphate | 0.01-0.1%. |

2. The durable coating composition of claim 1, further comprising: 77-58-7 Dibutyltin dilaurate 0.01-0.1%.

3. A method for making a durable coating composition for application to a wood drumstick, the method comprising:
premixing BMA/MMA copolymer and methyl amyl ketone, blending the BMA/MMA copolymer and methyl amyl ketone, and when the BMA/MMA copolymer is dissolved in the methyl amyl ketone, adding dipropylene glycol monomethyl ether and xylene so as to provide a first premix;
premixing 2-methoxy-1-methylethyl acetate and titanium dioxide, and blending so as to provide a second premix;
premixing tert-butyl acetate, Talc, and 2,6-Dimethyl-4-heptanone, and blending at high speed so as to provide a third premix;
mixing the first premix, the second premix, and the third premix, and blending so as to provide a first mixture;
adding Benzenesulfonyl Isocyanate, 4-Methyl- to the first mixture, while controlling moisture so as to be lower than 400 ppm, so as to provide a second mixture;
adding to the second mixture:
Hexane, 1,6-diisocyanato-, homopolymer,
4-Methyl-m-phenylene diisocyanate,
2-Methyl-m-phenylene diisocyanate,
Tris(nonylphenyl)phosphate, and
Dibutyltin dilaurate, so as to provide a third mixture; and
blending the third mixture so as to provide the durable coating composition.

4. The method for making a durable coating composition of claim 3, wherein each chemical substance is added in an amount in accordance with a respective weight percentage:

| | | |
|---|---|---|
| 1330-20-7 | Xylene | 10-30% |
| 28182-81-2 | Hexane, 1,6-diisocyanato-, homopolymer | 10-30% |
| 108-65-6 | 2-Methoxy-1-methylethyl acetate | 10-30% |
| 110-43-0 | Methyl amyl ketone | 5-10% |
| 540-88-5 | Tert-butyl acetate | 5-10% |
| 14807-96-6 | Talc (Mg3H2(SiO3)4) | 1-5% |
| 97-88-1/80-62-6 | BMA/MMA copolymer | 1-5% |
| 584-84-9 | 4-Methyl-m-phenylene diisocyanate | 0.1-1% |
| 13463-67-7 | Titanium dioxide | 0.1-1% |
| 91-08-7 | 2-Methyl-m-phenylene diisocyanate | 0.1-1% |
| 108-83-8 | 2,6-Dimethyl-4-heptanone | 0.1-1% |
| 4083-64-1 | Benzenesulfonyl Isocyanate, 4-Methyl- | 0.1-1% |
| 34590-94-8 | Dipropylene glycol monomethyl ether | 0.1-1% |
| 26523-78-4 | Tris(nonylphenyl)phosphate | 0.01-0.1%. |

5. A durable coating for protecting a wood surface, prepared from a composition comprising:
a mixture of polyisocyanates and diisocyanates including:
from 10% to 30% of Hexane, 1,6-diisocyanato-, homopolymer;
from 0.1% to 1% of 4-methyl-m-phenylene diisocyanate; and
from 0.1% to 1% of 2-methyl-m-phenylene diisocyanate;
from 1% to 5% of BMA/MMA copolymer;
from 1% to 5% of Talc (Mg3H2(SiO3)4) as filler;
from 0.1% to 1% of pigment;
from 0.1% to 1% of benzenesulfonyl isocyanate, 4-methyl- as a first process stabilizer;
from 0.01% to 0.1% of tris(nonylphenyl)phosphate as a second process stabilizer; and
from 0.1% to 1% of 2,6-dimethyl-4-heptanone as a defoamer.

6. The durable coating of claim 5, wherein the pigment is titanium dioxide.

7. The durable coating of claim 5, wherein the pigment is aluminum powder.

8. The durable coating of claim 5, the composition further comprising:
from 0.01% to 0.1% of dibutyltin dilaurate.

9. The durable coating of claim 5, the composition further comprising:
a mixture of solvents selected from the group of:
xylene, 2-methoxy-1-methylethyl acetate, methyl amyl ketone, tert-butyl acetate, dipropylene glycol monomethyl ether.

10. The durable coating of claim 5, wherein the wood surface is the tip and the shoulder area of a wood drumstick.

11. The durable coating of claim 5, wherein the composition is prepared by a process comprising:
preparing a BMA/MMA copolymer solution by dissolving from 1% to 5% of BMA/MMA copolymer in methyl amyl ketone in the range from 5% to 10%, followed by adding from 0.1% to 1% of dipropylene glycol monomethyl ether and from 10% to 30% of xylene, so as to provide a first premix;
mixing from 10% to 30% of 2-methoxy-1-methylethyl acetate and from 0.1% to 1% of titanium dioxide, and blending so as to provide a second premix;
mixing from 5% to 10% of tert-butyl acetate, from 1% to 5% of Talc (Mg3H2(SiO3)4), and from 0.1% to 1% of 2,6-dimethyl-4-heptanone, and blending at high speed so as to provide a third premix;
mixing the first premix, the second premix, and the third premix, and blending so as to provide a first mixture;
adding from 0.1% to 1% of benzenesulfonyl isocyanate, 4-methyl- to the first mixture, while controlling moisture so as to be less than 400 ppm so as to provide a second mixture;

adding to the second mixture:
  from 10% to 30% of hexane, 1,6-diisocyanato-, homopolymer,
  from 0.1% to 1% of 4-methyl-m-phenylene diisocyanate,
  from 0.1% to 1% of 2-methyl-m-phenylene diisocyanate,
  from 0.01% to 0.1% of tris(nonylphenyl)phosphate, and
  from 0.01% to 0.1% of dibutyltin dilaurate, so as to provide a third mixture; and
blending the third mixture, thereby providing the durable coating composition.

\* \* \* \* \*